(12) United States Patent
Martins

(10) Patent No.: US 7,000,200 B1
(45) Date of Patent: Feb. 14, 2006

(54) GESTURE RECOGNITION SYSTEM RECOGNIZING GESTURES WITHIN A SPECIFIED TIMING

(75) Inventor: Fernando C. M. Martins, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 381 days.

(21) Appl. No.: 09/662,679

(22) Filed: Sep. 15, 2000

(51) Int. Cl.
*G06F 3/00* (2006.01)

(52) U.S. Cl. ............... 715/863; 715/716; 715/723; 382/190; 382/209

(58) Field of Classification Search ............... 315/863, 315/716–776; 382/190, 209; 434/250, 252; 463/7; 715/863

See application file for complete search history.

(56) References Cited

U.S. PATENT DOCUMENTS

| | | | | |
|---|---|---|---|---|
| 5,256,832 A | * | 10/1993 | Miyake | 84/636 |
| 6,001,013 A | * | 12/1999 | Ota | 463/7 |
| 6,075,895 A | * | 6/2000 | Qiao et al. | 382/218 |
| 6,227,968 B1 | * | 5/2001 | Suzuki et al. | 463/7 |
| 6,249,606 B1 | * | 6/2001 | Kiraly et al. | 382/195 |
| 6,256,033 B1 | * | 7/2001 | Nguyen | 345/863 |
| 6,347,290 B1 | * | 2/2002 | Bartlett | 702/150 |
| 6,450,888 B1 | * | 9/2002 | Takase et al. | 463/43 |
| 6,801,637 B1 | * | 10/2004 | Voronka et al. | 382/103 |

OTHER PUBLICATIONS

E.D. Scheirer, "Tempo and beat analysis of acoustic musical signals", J. Acoustical Society of America, vol. 103, No. 1, pp. 588-601, Jan. 1998.

* cited by examiner

*Primary Examiner*—Kieu D. Vu
(74) *Attorney, Agent, or Firm*—Fish & Richardson P.C.

(57) ABSTRACT

Gesture recognition in which timing data is used to temporally segment video data into video clips. The timing data can be beat data extracted from an audio signal.

21 Claims, 5 Drawing Sheets

GESTURE RECOGNITION SYSTEM RECOGNIZING GESTURES WITHIN A SPECIFIED TIMING

BACKGROUND

This disclosure relates to gesture recognition.

Computers, game consoles, personal digital assistants, and other information appliances typically include some type of user interface through which inputs and outputs pass. Inputs from the user are often delivered through a cable from a keyboard, a mouse, a joystick, or other controller. The user actuates keys, buttons, or other switches included on the controller in order to provide input to the information appliance. The action a user takes in order to provide input to an information appliance, such as pressing a button, is referred to here as an "input action."

In some applications, it may be desirable for an input action to be driven by a particular human gesture. Specialized input devices can be used in such applications so that the user can provide command and control inputs by performing a particular gesture in direct physical contact with the input device. For example, in a dance competition game, the game prompts the user to "perform" various dance moves. A pressure sensitive pad is typically provided so that the user can perform a dance move by tapping a specified portion of the pressure sensitive pad with one of the user's feet. In this way, the input action (that is, tapping a portion of the pressure sensitive pad) captures an aspect of a dance move. Another example is a music creation program in which a user can hit a MIDI drum pad with drumsticks in order to simulate playing the drums.

Other approaches to supplying input to an information appliance may make use of gesture recognition technology. In one approach, motion capturing sensors, e.g, body suits or gloves are attached to the user to measure the user's movements. These measurements are then used to determine the gesture that the user is performing. These devices are often expensive and intrusive. Gesture recognition makes use of pattern recognition technology. Generally, such an approach involves capturing video of a user performing various actions, temporally segmenting the video into video clips containing discrete gestures, and then determining if each video clip contains a predefined gesture from a gesture vocabulary. For example, one potential application of such gesture recognition technology is to recognize gestures from the American Sign Language. Such gesture recognition technology typically requires the video to be manually segmented into video clips, which makes such conventional gesture recognition technology less than fully automatic.

DETAILED DESCRIPTION

Figure 1:
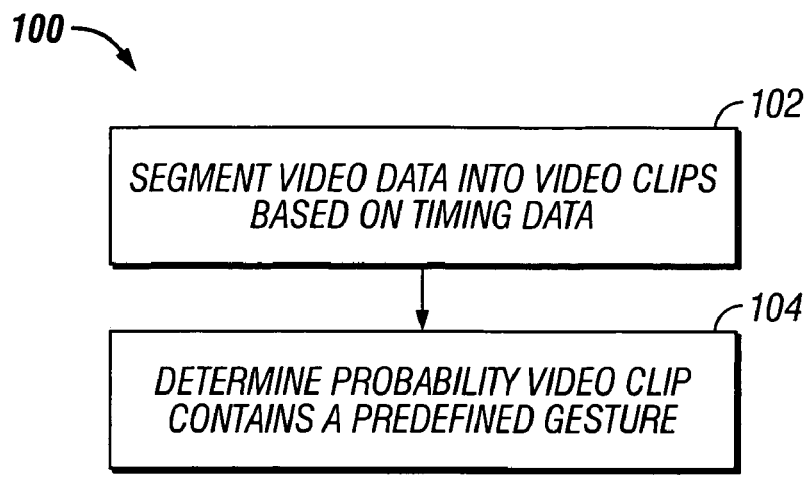
FIG. 1 is a flow diagram of a gesture recognition process.
Figure 2:
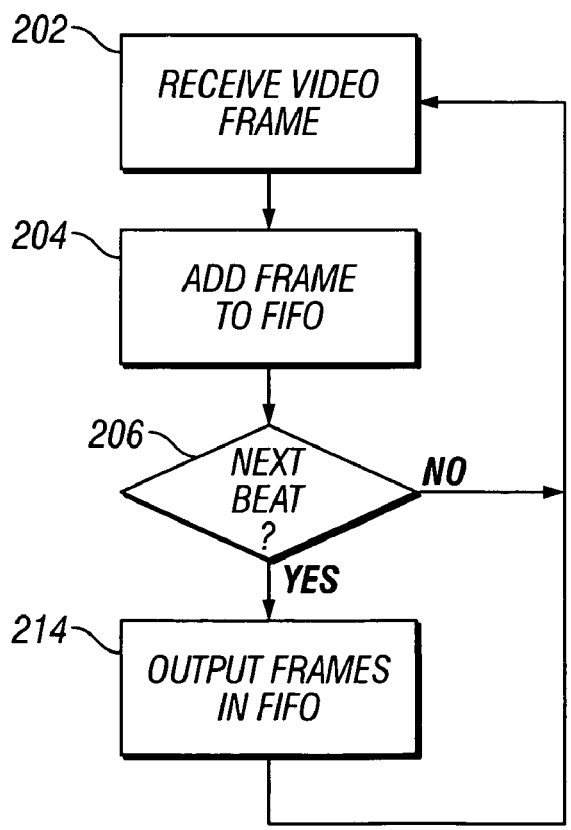
FIG. 2 is a flow diagram of a process of segmenting the video data into video clips based on timing data.

FIG. 1 is a flow diagram of a gesture recognition process 100. Process 100 includes segmenting video data into video clips based on timing data (block 102). The timing data is used to define a window within which a user is expected to perform a single desired gesture. The video data is segmented so that each video clip contains the video data for a single window. In one embodiment, the timing data is a function of an audio signal having a beat. AS used here, beat refers to any audibly perceptible semi periodic pulse contained within an audio signal. In such an embodiment, the user is expected to perform various predefined gestures "on the beat." That is, the window in which the user is expected to perform each gesture is defined by the beats of the audio signal. For example, the window can be defined so as to require the user to perform a desired predefined gesture within one second after a beat is played by a speaker. Alternatively, the window can be defined so as to require the user to perform the desired gesture in a one second time period starting one-half second before a beat is played by the speaker and ending one-half second after the beat. Another alternative is to define the window by a pair of adjacent beats of the audio signal.

Because the user is expected to perform each gesture within a window defined by the timing data, the process 100 can automatically segment the video data into video clips based on the timing data; conventional manual techniques for segmenting video data need not be used. Consequently, process 100 can be used to segment video data into video clips reliably and in real time.

The process 100 also includes determining the probability that the video clip contains a predefined gesture (block 104). Any conventional pattern recognition techniques can be used to determine the probability that the video clip contains a predefined gesture. For example, Hidden Markov Models ("HMMs"), neural networks, and Bayesian classifiers can be used.

Typically, the video clip is compared to multiple predefined gestures that are included in a gesture vocabulary. For each predefined gesture in the gesture vocabulary, the probability that the video clip contains that gesture is determined. The probabilities can then be compiled in a gesture probability vector. By keeping the predefined gesture vocabulary relatively small, the performance of the pattern recognition techniques can be improved. However, a gesture vocabulary of various sizes can be used.

The window can also be defined by a pair of subsequent beats.

Figure 3:
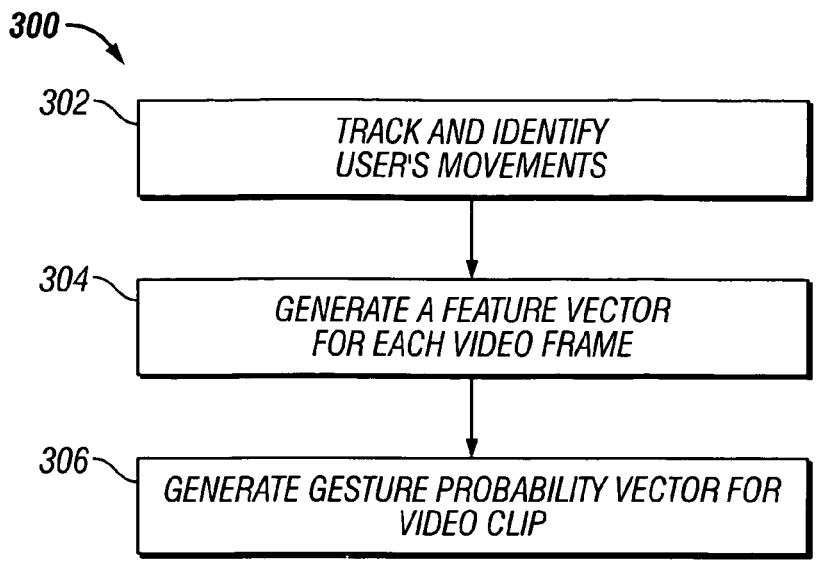
FIG. 3 is a flow diagram of a process of determining the probability that a video clip contains a predefined gesture.

FIG. 3 is a flow diagram of a process 300 of determining the probability that a video clip contains a predefined gesture. First, movement of the user's body is identified and tracked for each frame in the video clip (block 302). In one embodiment, the moving regions in each video frame in the video clip are identified. A three frame difference classifier can be used to identify the moving regions in each video frame in the video clip. For a given video frame in the video clip (referred to here as the current frame), a pixel-by-pixel comparison of the current frame and the immediately preceding frame, and a pixel-by-pixel comparison of the current frame and the immediately following frame, is performed. For a given pixel in the current frame, the difference between the color of that pixel and the color of the corresponding pixel in the immediately preceding frame is determined. Also, for a given pixel in the current frame, the difference between the color of that pixel and the color of the corresponding pixel in the immediately following frame is determined. If both differences exceed a predefined tolerance for a given pixel, that pixel is considered to be a moving pixel. The moving pixels in the current frame are then clustered into moving regions (also referred to as "blobs") using morphological image processing operations. The morphological image processing operations operate to remove noise from the blobs. Alternatively, other motion estimation and clustering techniques can be used to identify the moving regions in each frame of the video clip.

Alternatively, one or more objects associated with the user can be identified and tracked in each frame in the video clip. For example, the user can wear colored wrist bands and/or a head band. The movements of the wrist and head bands can then be identified and tracked using a conventional object tracker. Such an object tracker is initialized by first capturing data of the user wearing the wrist and/or head bands and then having the user (or other operator) manually identify the wrist and/or head bands in the video data. For example, a video camera can capture a single video frame of the user wearing the wrist and/or head bands. Then the user can manipulate a mouse or other input device in order to identify the wrist and/or hand bands within the captured video frame. Then, the size and average color of the regions of the video corresponding to the wrist and/or head bands are calculated. Also, the center of each region can be determined.

Conventional object tracking techniques can then be used to track the identified wrist and/or head bands within a video clip. For example, for each frame in a video clip, a region corresponding to each tracked object (e.g., a wrist and/or head band) can be identified by locating a region in the frame having a size and average color that is similar to the size and average color calculated for the tracked object during initialization. Then, the XY coordinates of the center of the identified region can be determined. Next, feature vectors are generated for each video frame (block 304). A feature vector is an array of numbers that describes the shape, location, and/or movement of one or more moving regions in each frame. Feature vectors can be generated in conventional ways. The data contained in the feature vectors depends on the particular techniques used to track and identify the user's movements. For example, if the user's movements are tracked by identifying moving blobs in each frame of the video clip, the feature vectors can include position information, motion information, and blob shape descriptors for those moving regions associated with movement of the user's head and hands. Alternatively, if the user's movement is tracked by locating the center of one or more pre-identified objects (e.g., a wrist or head band) in each frame of a video clip, the feature vector can contain the XY coordinates for the center of each tracked object and its derivatives.

Then, a gesture probability vector is obtained from the sequence of feature vectors (block 306). For each predefined gesture contained in a gesture vocabulary, the probability that the video clip contains that gesture is determined. The probabilities for all the gestures in the gesture vocabulary are then compiled in a gesture probability vector.

For example, the gesture probability vector can be generated using a bank of HMMs having at least one HMM for each gesture in the gesture vocabulary. Each HMM is trained using, for example, Baum-Welch training and a corpus of gesture prototypes for the gesture associated with that HMM. Recognition using the bank of HMMs is implemented using, for example, the Viterbi techniques and implementation-specific heuristics. When the sequence of feature vectors for a given video clip is provided to the bank of HMMs, the evolution of each HMM obtains a probability that the video clip contains the gesture associated with that HMM. The probabilities generated by each of the HMMs in the bank are compiled in a gesture probability vector. Alternatively, other pattern recognition technologies such as neural networks or Bayesian classifiers can be used.

Figure 4:
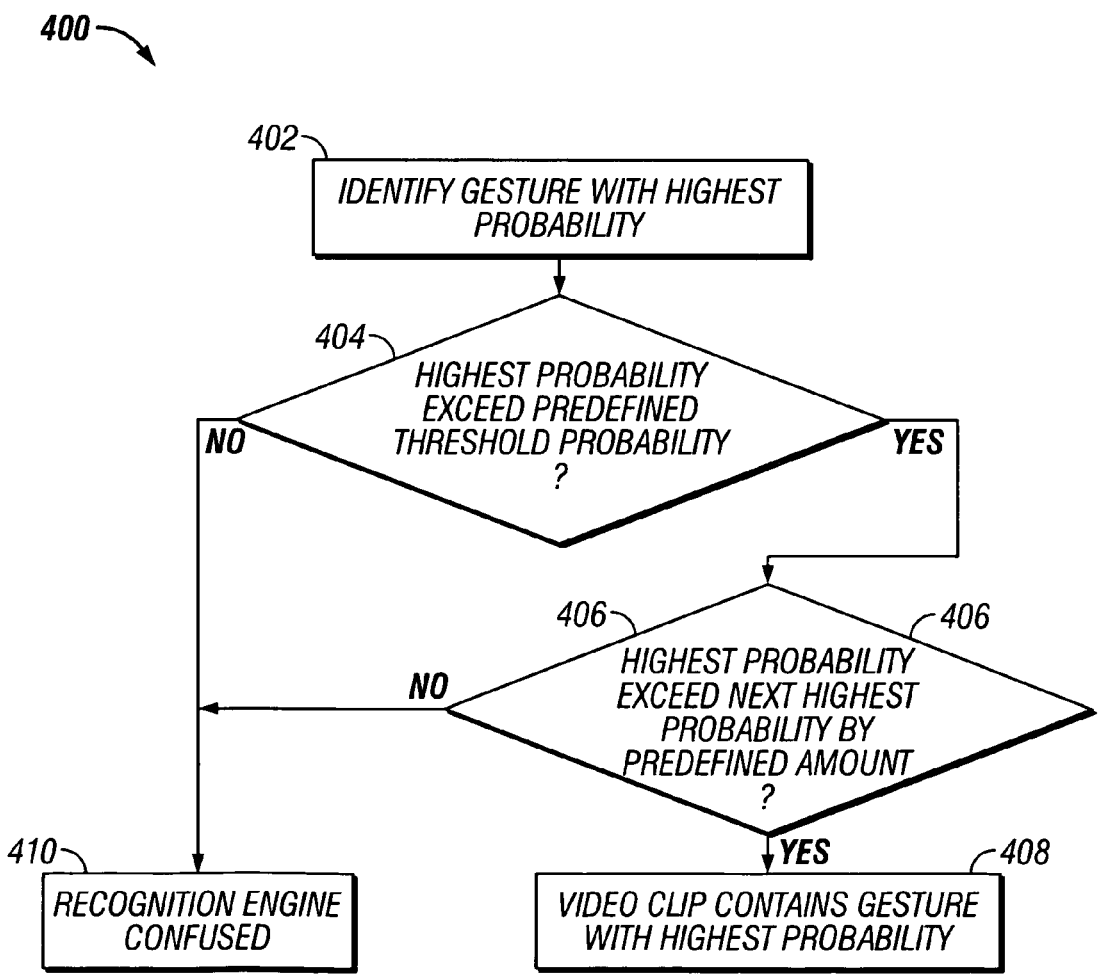
FIG. 4 is a flow diagram of a process for determining if the video clip contains a gesture contained in the gesture vocabulary.

The gesture probability vector then can be used to determine if the video clip contains a gesture contained in the gesture vocabulary. FIG. 4 is a flow diagram of a process 400 for determining if the video clip contains a gesture contained in the gesture vocabulary. First, the gesture with the highest probability is identified from the gesture probability vector (block 402). If the highest probability exceeds a predefined threshold probability (which is checked in block 404) and exceeds the next highest probability in the gesture probability vector by a predefined amount (which is checked in block 406), then the video clip is considered to contain the gesture with the highest probability (block 408). If the highest probability does not exceed the predefined threshold probability or does not exceed the next highest probability by a predefined amount, then the recognition engine is considered to be confused (block 410). When the recognition engine is confused, the video clip is considered not to include any gesture from the gesture vocabulary.

Figure 5:
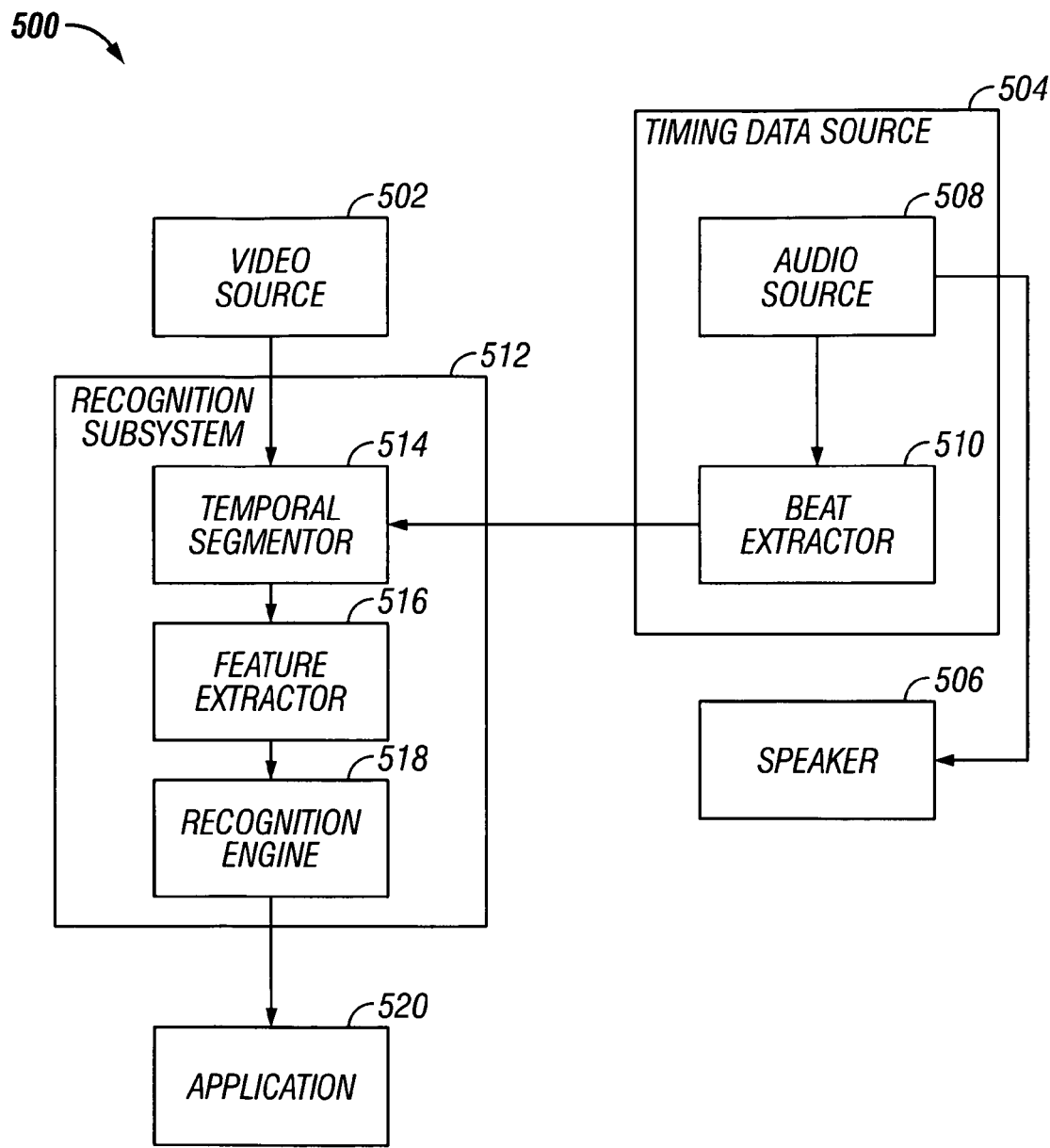
FIG. 5 is a block diagram of a system that can be used to implement the gesture recognition process shown in FIG. 1.

FIG. 5 is a block diagram of a system 500 that can be used to implement the gesture recognition process 100. The system 500 includes a video source 502 that provides video data of a user's movements. For example, the video source 502 can include a video camera or other device that provides "live" (that is, real time) video data of the user's movement. In addition or instead, the video source 502 can include a video storage and retrieval device such as a video cassette recorder ("VCR") or digital video disk ("DVD") player that provides previously captured video data of the user's movements.

The system 500 also includes a timing data source 504. The timing data source 504 provides timing data that is used to define a window in which a user is expected to perform a desired gesture. For example, in the embodiment shown in FIG. 5, the timing data is a function of an audio signal having a beat. The system 500 also can include a speaker 506 or other device that plays the audio signal so that the user can hear the audio signal and perform a gesture on the beat of the audio signal.

The audio signal can be provided by an audio source 508 included in the timing data source 504. The audio source 508 can include any device that provides an audio signal. For example, the audio source 508 can include an audio synthesizer and/or a compact disk or other audio media player. Alternatively, the audio source 508 and the video source 502 can be combined in a single device, such as a video camera, that provides both the audio signal and the video data. The audio signal provided by the audio source 508 is provided to a beat extractor 510. The beat extractor 510 generates the timing data by extracting beat data from the audio signal. For example, the beat data can include the beat frequency of the audio signal. The beat frequency can be used to define the window in which the user is expected to perform a desired gesture, for example, by centering the window about the beat.

Beat data can be extracted from the audio signal using a variety of techniques. For example, if the audio signal is a musical industry digital interface ("MIDI") signal, the beat data can be generated from channel 10 of the MIDI audio signal, which defines a drum part of the signal. The frequency and phase information included in channel 10 of such a MIDI audio signal can be used to determine when a beat is going to occur in the audio signal. Other beat tracking and/or prediction techniques can also be used to extract beat data from the audio signal. An example of a suitable beat prediction technique is described in Eric D. Scheirer, "Tempo and Beat Analysis of Acoustic Musical Signals," Journal of the Acoustical Society of America, volume 103, number 1, January 1998. Beats can also be manually obtained offline.

The system 500 also includes a recognition subsystem 512. The recognition subsystem 512 includes a temporal segmentor 514 that receives the video data from the video source 502 and segments the video data into video clips based on the timing data. Each video clip contains that portion of the video data corresponding to a single window in which the user is expected to perform a desired gesture. The temporal segmentor 514 uses the timing data to determine where each window begins and/or ends in order to segment the video data into video clips.

The audio signal, video data, and timing data are synchronized so that the user is prompted to perform the desired gesture when expected by the recognition subsystem 512. The video source 502, timing data source 504, speaker 506, and temporal segmentor 514 are synchronized so that, for a given video clip, the timing data for that video clip (that is, the timing data that is used to identify the beginning and/or end of the window for that video clip) is extracted from the audio signal and provided to the temporal segmentor 514 in time to allow the temporal segmentor 514 to segment the video clip.

The recognition subsystem 512 also includes a feature extractor 516. The feature extractor 516 generates a feature vector for each frame of the video clip. For example, as noted above, the features vectors can be generated by generating position and motion information and blob shape descriptors for those moving blobs associated with the movement of the user's head and hands. Alternatively, the feature vectors can be generated by determining the XY coordinates for the center of one or more tracked objects (e.g., wrist and/or head bands worn by the user).

The feature vectors for each video clip are supplied to a recognition engine 518. For each predefined gesture included in a gesture vocabulary, the recognition engine 518 determines the probability that the video clip contains the predefined gesture. These probabilities can be combined into a gesture probability vector. The recognition engine 518 can be implemented using any pattern recognition technology including, for example, a bank of HMMs, neural networks, or Bayesian classifiers.

The gesture probability vectors produced by the recognition engine 518 can be supplied to an application 520. The application 520 can then use the gesture probability vector to determine which, if any, gesture from the gesture vocabulary is contained in the video clip, for example, in accordance with process 400.

The system 500 can be implemented in software, hardware, or a combination of software and hardware. For example, the system 500 can be implemented using a general-purpose computer programmed to implement the components of the system 500. A video camera can be connected to the general-purpose computer in order to provide video data to the system 500. In other embodiments, the system 500 can be implemented using other information appliances such as special-purpose computers, game consoles, and PDAs.

The system 500 allows the user to provide gesture-based input to an application 520 without using specialized controllers or sensors that are physically connected to the system or the user. The user is untethered and can move freely while providing input to the system 500 as long as the user remains within the video camera's range and field of view. Thus, the system 500 can be implemented in an exercise system in which the movements made by the user in providing gesture-based input to the system 500 give the user an aerobic workout. Also, the system 500 can be implemented so that users of all sizes and shapes can provide input to the system 500, without requiring use of different controllers for different users. The system 500 can be used in a wide range of embodiments. For example, the system 500 can be used in game and exercise systems (e.g., dance, music, and sports simulation games).

Figure 6:
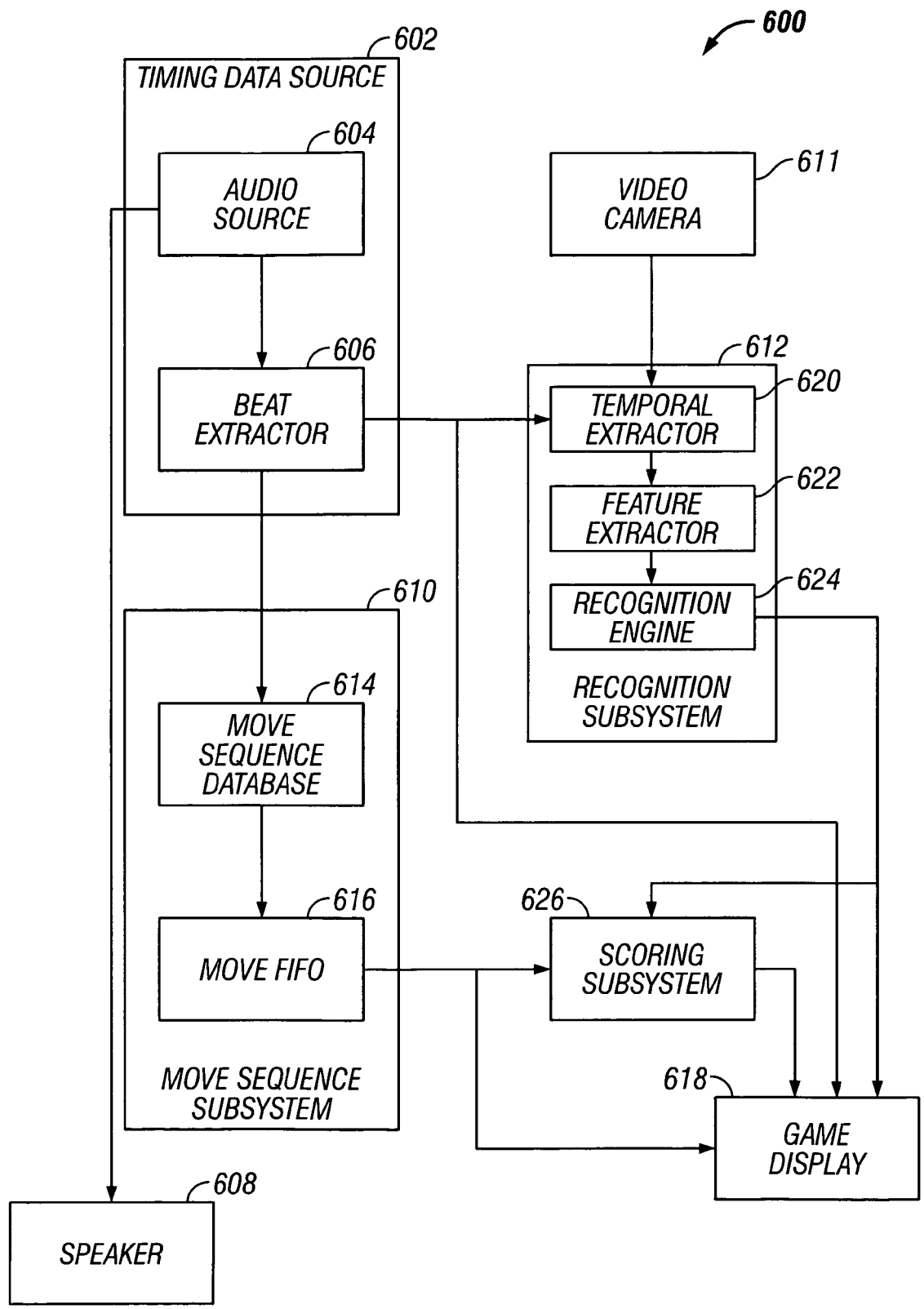
FIG. 6 is a block diagram of an embodiment that is designed using this technology.

In one embodiment, the system 500 is used in a dance competition game system 600, which is shown in FIG. 6. Generally, the dance competition game system 600 prompts the user to perform various dance moves on the beat of music played for the user. The user scores points by successfully performing the requested dance moves on the beat of the music. The dance competition game system 600 includes a timing data source 602, which includes an audio source 604 and a beat extractor 606. The audio source 604 provides the music in the form of an audio signal that is sent to a speaker 608, which plays the music for the user. The audio signal is provided to the beat extractor 606, which extracts beat data from the audio signal, as described above.

The beat data that is extracted from the audio signal is supplied to a move sequence subsystem 610 and a recognition subsystem 612. The move sequence subsystem 610 includes a move sequence database 614. Dance moves that the user is expected to perform are retrieved from the database. Each dance move that is retrieved from the move sequence database 614 is placed into a move FIFO queue 616. The move FIFO queue 616 contains the next X dance moves the user is to perform on the next X beats of the music. Icons or other data (e.g., text descriptions) representing the next X dance moves are displayed on a game display 618 that is connected to the move FIFO queue 616.

Figure 7A:
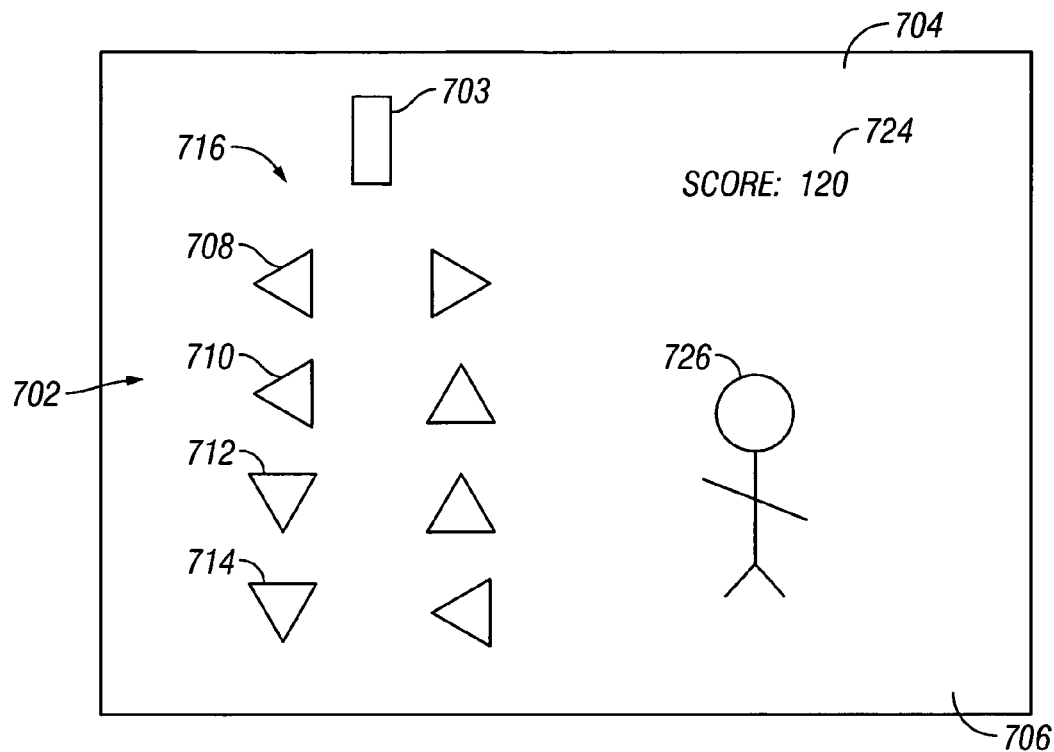
FIGS. 7A–7B show examples of a game screen shots from the system shown in FIG. 6.
Figure 7B:
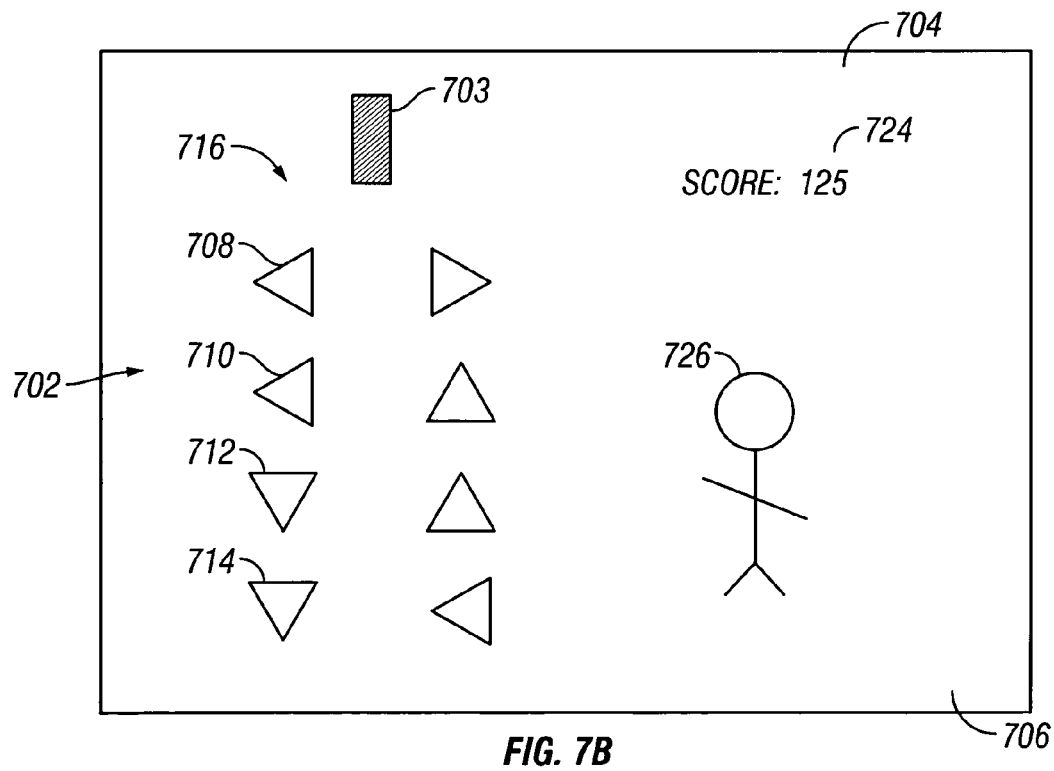

One example of a game display 618 is shown in FIGS. 7A–7B. The game display 618 includes a dance move region 702, a score region 704, and an avatar region 706. Pairs of icons 708, 710, 712, and 714 represent the next four dance moves the user is to perform on the next four beats of the music (i.e., X equals four). In the example shown in FIGS. 7A–7B, each pair of icons includes a left icon, which represents the direction in which the user is to point the user's left arm, and a right icon, which represents the direction in which the user is to point the user's right arm. For example, the top pair of icons 708 indicates that the user is to point the user's left arm to the left, while pointing the user's right arm to the right.

The icons 708, 710, 712, and 714 are displayed in the dance move region 702 in the order in which the dance moves associated with those icons are to be performed by the user. Thus, the user can determine which dance move the user is to perform next by looking at the top 716 of the dance move region 702 of the display 618. The user can determine which dance moves the user is to perform on the next three successive beats of the music by looking at the icons 710, 712, and 714, displayed beneath the top pair of icons 708.

As shown in FIG. 7B, after the next beat of the music has occurred, the top pair of icons 708 is removed from the dance move region 702 and each of the other pairs of icons 710, 712, and 714 is scrolled up on the dance move region 702. A new pair of icons 720 representing the dance move added to the tail of the move FIFO queue 616 is also displayed at the bottom 722 of the dance move region 702.

The move region 702 of the game display 618 also can include a beat indicator 703. The beat indicator 703 provides a visual indication of the beat data. For example, the beat indicator 703 can be implemented as a blinking square that blinks to the beat of the music (i.e., based on the beat data extracted from the music by the beat extractor 606).

The user's actions are captured by a video camera 611 (shown in FIG. 6), which supplies video data to the recognition subsystem 612. The recognition subsystem 612 includes a temporal segmentor 620, a feature extractor 622, and a recognition engine 624. The temporal segmentor 620 segments the video data received from the video camera 611 into video clips based on the beat data. Each video clip is associated with a window in which the user is to perform a given dance move. Each video clip is provided to the feature extractor 622, which generates a feature vector for each video frame contained in the video clip. The feature vectors for a given video clip are then provided to the recognition engine 624, which generates a gesture probability vector based on a predefined gesture vocabulary. The predefined gesture vocabulary includes each of the dance moves that the user may be asked to perform by the system 600. That is, the gesture vocabulary includes each of the dance moves contained in the move sequence database 614. The recognition engine 624 can be implemented as a bank of HMMs, with one HMM associated with each gesture in the gesture vocabulary. Each HMM calculates the probability that the video clip contains the gesture associated with that HMM. The probabilities generated by each of the HMMs in the bank are combined to create the gesture probability vector for that video clip.

The gesture probability vectors produced by the recognition subsystem 612 are provided to a scoring subsystem 626. The scoring subsystem 626 also checks if the dance move contained in the video clip was the dance move the user was requested to perform on the beat during the window associated with that video clip. If the video clip contains the requested dance move, the user scores points. The user's current score is displayed on the game display 618. For example, as shown in FIGS. 7A–7B, the user's score 724 is displayed in the score region 704 of the game display 618. If the user successfully performs the dance move associated with the top pair of icons 708 on the next beat, then the user's score 724 is increased, as shown in FIG. 7B.

The game display 618 can also display an avatar. The avatar is an animated, graphical representation of the user or some other person. In one embodiment, the avatar can be rendered, performing the dance move the gesture recognition subsystem 612 determines that the user has performed during the most recent window. For example, as shown in FIGS. 7A–7B, the game display 618 can include an avatar 726 that is displayed in the avatar region 706 of the game display 618. If the user performs the dance move associated with the top pair of icons 708 on the next beat in the music, the avatar 726 is shown performing that dance move. If the user performs a dance move that is recognized by the system 600 but not the dance move the user was requested to perform, the avatar 726 can be displayed performing the recognized dance move. If the recognition subsystem 612 is unable to recognize the move performed by the user, the avatar can be shown performing a default gesture that indicates to the user that the system was unable to recognize the move performed by the user.

This may also be tangibly stored on a computer readable medium that has instructions to carry out these operations.

A number of embodiments of the invention have been described. Nevertheless, it will be understood that various modifications may be made without departing from the spirit and scope of the invention. For example, elements described as being implemented in hardware can also be implemented in software and/or a combination of hardware and software. Likewise, elements described as being implemented in software can also be implemented in hardware and/or a combination of hardware and software. Accordingly, other embodiments are within the scope of the following claims.

What is claimed is:

1. A method for recognizing gestures in video data at times associated with music comprising:
    receiving audio data which represents music that has a beat formed of an audibly perceptible periodic pulse contained within the audio data;
    obtaining beat data indicative of said beat data for said audio data;
    playing said audio data, and using said beat to determine a gesture window associated with said audio data;
    obtaining video data during the time of said gesture window during which a target gesture should occur;
    segmenting said video data to form individual frames of video data and investigating said frames to recognize gestures in said frames and to determine gesture probabilities which represent whether said gestures represent target gestures; and
    determining if a gesture probability associated with said gestures represents that the target gesture has been determined during said frame.

2. The method of claim 1, wherein determining the probability that the video data contains each of the target gestures includes evaluations of Hidden Markov Models.

3. The method of claim 1, further comprising displaying a target gesture to be performed by the subject of the video data.

4. The method of claim 1, further comprising generating a feature vector for each video frame of the video data.

5. The method of claim 1, further comprising generating a score based on whether the video data contains the target gesture.

6. The method of claim 5, further comprising displaying the score.

7. A system for recognizing gestures in video data at times associated with music comprising:
    an audio receiving part that receives audio data representing music that has a beat formed of an audibly perceptible periodic pulse contained within the audio data;
    a recognition subsystem and timing data source, operative to determine said beat data indicative of said beat, and to define a gesture window of time based on said beat, during which gesture window, a target gesture should occur;
    a video device, receiving video, and segmenting said video into a plurality of different frames; and
    wherein said recognition subsystem and timing data source is also operative to recognize gestures within said frames and determine probabilities of which gestures are represented within the frames and whether the gestures represent the target gesture.

8. The system of claim 7, wherein the recognition subsystem and timing data source operates based on a plurality of Hidden Markov Models.

9. The system of claim 7, further comprising:
    a video source, in communication with the recognition subsystem and timing data source, to provide the video to the recognition subsystem and timing data source.

10. The system of claim 7, further comprising a move subsystem, in communication with the recognition subsystem and timing data source, to provide said target gesture to be performed by the subject of the video.

11. The system of claim 10, wherein the target gesture is a dance move that is to be performed by the subject of the video.

12. The system of claim 10, further comprising a scoring subsystem, in communication with the recognition subsystem and timing data source and the move subsystem, to determine a score based on whether the video contains the target gesture.

13. The system of claim 12, further comprising a display subsystem, in communication with the scoring subsystem, to display a score that is a function of whether the video contains the target gesture.

14. The system of claim 13, wherein the display subsystem is in communication with the move subsystem and is configured to display a gesture request based on the target gesture.

15. A system as in claim 7, wherein said recognition subsystem and timing data source is also operative to analyze said audio data to automatically determine beat data associated with the audio data.

16. A system as in claim 15, wherein said audio data includes MIDI data and said recognition subsystem and timing data source analyzes the MIDI data to automatically determine the data from a specified channel of the MIDI data.

17. A computer program product, tangibly stored on a computer readable medium, for recognizing gestures in video data at times associated with music, comprising instructions operable to cause a programmable processor to:

receive audio data which represents music that has a beat formed of an audibly perceptible periodic pulse contained within the audio data;

obtaining beat data indicative of said beat associated with said audio data;

play said audio data, and using said beat data to determine a gesture window associated with the audio data;

obtain video data during a time defined by said gesture window during which a target gesture should occur;

segment said video data to form individual frames of video data and investigate said individual frames to determine gesture probabilities indicative of whether target gestures are contained in said frames; and determine if a gesture probability represents that the target gesture has been determined during said frame.

18. A product as in claim 17, wherein said obtaining beat data comprises extracting beat data automatically from the audio data.

19. A product as in claim 18, wherein said extracting comprises analyzing a MIDI sequence representing said audio data, and extracting beat data from a specified channel of the audio data that represents a drumbeat.

20. A computer program product as in claim 17, further comprising instructions to automatically analyze said audio data to automatically determine beat data associated with the audio data.

21. A computer program product as in claim 20, wherein said audio data includes MIDI data, and said instructions analyze a specified channel of the MIDI data to determine the data from said specified channel.

* * * * *